(12) United States Patent
Grundström

(10) Patent No.: US 7,908,388 B1
(45) Date of Patent: Mar. 15, 2011

(54) MULTICAST ADDRESS TO PACKET IDENTIFIER MAPPING FOR BROADCAST SYSTEMS

(75) Inventor: Mika Grundström, Tampere (FI)

(73) Assignee: Nokia Corporation, Espoo (FI)

( * ) Notice: Subject to any disclaimer, the term of this patent is extended or adjusted under 35 U.S.C. 154(b) by 2455 days.

(21) Appl. No.: 09/990,039

(22) Filed: Nov. 20, 2001

(51) Int. Cl.
*G06F 15/16* (2006.01)
*H04N 7/16* (2006.01)

(52) U.S. Cl. .................. 709/231; 709/230; 725/153

(58) Field of Classification Search .................. 709/245, 709/253, 230–231; 725/143, 147, 153, 62, 725/109
See application file for complete search history.

(56) References Cited

U.S. PATENT DOCUMENTS

| | | | |
|---|---|---|---|
| 5,544,161 A * | 8/1996 | Bigham et al. | 370/397 |
| 6,064,676 A | 5/2000 | Slattery et al. | |
| 6,216,167 B1 * | 4/2001 | Momirov | 709/238 |
| 6,226,291 B1 * | 5/2001 | Chauvel et al. | 370/392 |
| 7,519,811 B1 | 4/2009 | Hara | |
| 2004/0202328 A1 | 10/2004 | Hara | |

FOREIGN PATENT DOCUMENTS

| | | |
|---|---|---|
| EP | 0901261 A2 | 3/1999 |
| KR | 19990088222 | 12/1999 |
| WO | WO 97/20413 | 6/1997 |

OTHER PUBLICATIONS

PCT International Search Report, International Application No. PCT/IB02/04808, Date of Completion of Search—Mar. 5, 2003, Sheets 1, Continuation of First Sheet (2), and 2.
European Search Report, Apr. 26, 2007, 3 pages.
Translation of Korean Intellectual Property Office Non-Final Rejection dated Oct. 8, 2008.

* cited by examiner

*Primary Examiner* — Peling A Shaw
(74) *Attorney, Agent, or Firm* — Locke Lord Bissell & Liddell

(57) ABSTRACT

A mapping method for simplifying broadcast systems, such as Digital Video Broadcast Terrestrial (DVB-T). Broadcast address information is mapped to the Packet Identifier (PID) field of a Motion Picture Expert Group level 2 transport stream (MPEG2-TS). Table complexity can be minimized, or the service information (SI) tables can be removed without impacting hardware level discrimination of likely relevant packets.

6 Claims, 9 Drawing Sheets

| SERVICE | IP ADDRESS | |
|---|---|---|
| Service 1 | IP1 | |
| Service 2 | IP2 | |
| Service B | 226.0.35.9 | 11100010.00000000.00100011.00001001 |
| | | ADDRESS INFO:   0011 00001001 |
| | | FLAG INFO:   1 |
| | | PID EXPECTED   10011 00001001 |

MULTICAST ADDRESS TO PACKET IDENTIFIER MAPPING FOR BROADCAST SYSTEMS

FIELD OF THE INVENTION

This invention relates to a mapping scheme that uses a filter to select a packet from a plurality of packets, and more particularly, to a method for using address information in the packet header to serve as selection criteria.

BACKGROUND OF THE INVENTION

Digital video and audio signals (synchronized in the form of a 'program') can be transmitted over a network using MPEG2 encoding. In a multicast system using MPEG2-TS, data is distributed from a terminal to a network, where multiple terminals may access the same data stream. Similarly, multiple streams may be broadcast onto a single data channel.

Multicast data streams are divided into packets for transmission. A data stream, in the form of packets, is multiplexed onto a single data channel with other similarly constructed data streams. To allow receiving terminals to differentiate between desired and other streams, packets are encoded with a field serving as selection criteria. This field permits the receiver to rapidly select desired packets and discard unwanted packets.

In an MPEG2-TS encoded system, streams are divided into 188-byte packets with 4-bytes of header information followed by 184-byte payload. A 13-bit segment within the header of the packet is the PID, which provides the selection criteria for these packets. The PID identifies which packets correspond to each of multiple data streams (or programs) multiplexed onto a single communications channel. In a multicast network, transport streams originating from the server have no inherent destination; consequently, any listener on the network can obtain the packets. For example, a network terminal wishing to obtain the program need only determine the PID of the desired program, and request that its upstream router subscribe to the stream (routers with no subscribers need not accept the multicast stream.)

The PID of the desired program is determined by cross-referencing the Service Announcement Protocol (SAP) tables (IP addresses mapped to services) with the Service Information (SI) tables (IP Addresses to PID's). Software generated MAC addresses for the PID are used to allow receiving terminals to quickly filter unwanted packets. The network interface hardware accepts only those packets whose PID value matches that of the desired program, resulting in reduced load on the protocol stack.

It is preferred to have network hardware filter packets as many packets as possible, and make minimal use of table structure and broadcast overhead messages.

LEXICON

| DVB-T | Digital Video Broadcast - Terrestrial |
|---|---|
| IP | Internet Protocol |
| IPv4 | Internet Protocol version 4 |
| IPv6 | Internet Protocol version 6 |
| MAC | Media Access Control |
| MPEG2 | Motion Picture Expert Group level 2 |
| PID | Packet Identifier |
| SAP | Service Announcement Protocol |
| SI | Service Information |
| TS | Transport Stream |

SUMMARY OF THE INVENTION

With the aforementioned in mind, it is an object of the invention to correlate the multicast IP address of a packet to the data that is encoded within the header of said packet.

Another objective of this invention is to simplify or reduce the number of tables that are maintained and broadcast throughout a network.

Multicast networks utilizing the cursory hardware selection process described above can benefit from a closer link between the multicast IP address and the packet being transmitted. This invention presents a system and method to provide a selection criteria that is based only on the multicast IP address of the packet being transmitted. By directly mapping the multicast IP address to the PID, considerable overhead can be saved, as there is no need to maintain and update tables of information linking selection criteria, the PID, to the multicast IP address.

The PID mapping can be implemented by using a direct subset of the multicast IP address, or some transformed version of the IP address. This mapping takes the place of a service information table, and permits rapid selection in hardware with no load on the protocol stack above that found in current systems.

By using a subset of the multicast IP address to directly relate the multicast IP address to the PID of an MPEG2-TS, it is possible to achieve these objectives.

BRIEF DESCRIPTION OF DRAWINGS

An exemplary embodiment of the invention herein disclosed is set forth in the following detailed specification. This specification includes the drawings wherein.

DETAILED DESCRIPTION OF INVENTION

This invention relates to multicast IP address information encoded in multicast data packets. This information is encoded by a transmitting terminal and is used as the basis for hardware-level packet selection by a receiving terminal.

Figure 1:
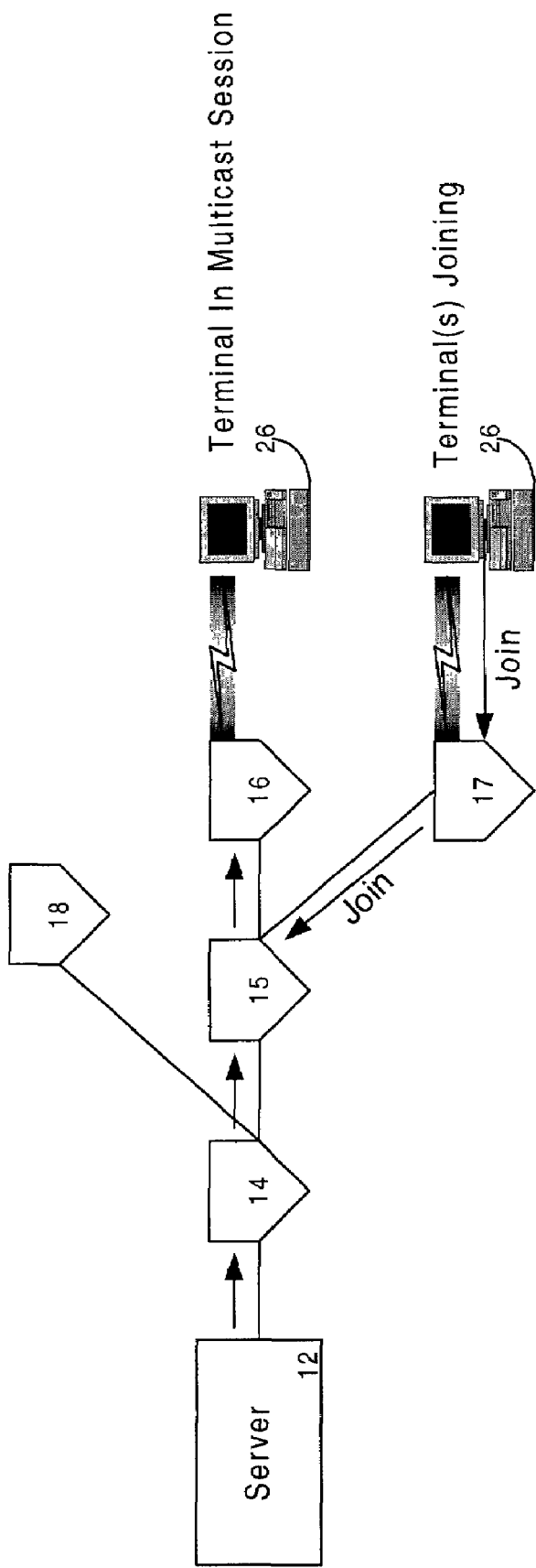
FIG. 1 is a network diagram illustrating the operation of a multicast network.

A simple multicasting system that incorporates the invention is illustrated in FIG. 1. A network made up of switching nodes 14-18 is used to route data from a server 12 to receiving terminals 24 and 26. An actual system may have many switching nodes and a correspondingly large number of servers and receiving terminals. A typical terminal station could include both a server for transmitting data and a terminal for receiving data The data in the network is divided into packets that each include a header and a payload. When a packed arrives at a switching node, the header is examined so that the packet can be routed toward the destination terminal as indicated by the header. In FIG. 1, the basic multicast session is from server 12 to terminal 24 via switching nodes 14, 15, and 16. Another terminal, such as terminal 26, can join the multicast session by determining the IP address of the desired service and requesting that an upstream router or switching node 15 route the data stream said terminal 26.

Where services to be received are already broadcast to the network, terminals can join by initiating their network interface hardware to start selecting packets based on the PID of incoming packets. Once the terminal becomes aware (e.g., via SAP) that services within the service domain are available, the terminal determines the link layer multicast address, derives the PID, and then instructs the hardware to begin selecting packets. In this case, the request to join is a local function of the protocol stack of the receiving terminal.

Since the network potentially contains a large number of data packets, and since only a small subset of these might be requested by any receiving terminal, a hardware based filtration scheme is used to limit the packets that are brought into the receiving terminal for software analysis. In the network described, each packet header has a field that is used by receiving terminals to determine if the packet should have software analysis by the receiving terminal. The subject of the invention is this selection criteria field within the packet header.

When multiplexed onto a data channel, the packets associated with each of a plurality of multicast data streams are identified and differentiated by a selection criteria field in the header. Since several data streams can be combined on a channel, an efficient network requires a rapid method to sort packets and discard the majority of unwanted packets. An effective method employs a hardware implementation that selects packets, based on the selection criteria, to accept into the protocol stack of the receiving terminal. Even though in some embodiments, such as MPEG2, the size selection criteria leaves the possibility of identical criteria among different streams, the benefits of even this cursory hardware check are considerable.

The hardware selection scheme is implemented in this invention by using some information characteristic of the multicast IP address as the selection criteria.

Figure 2:
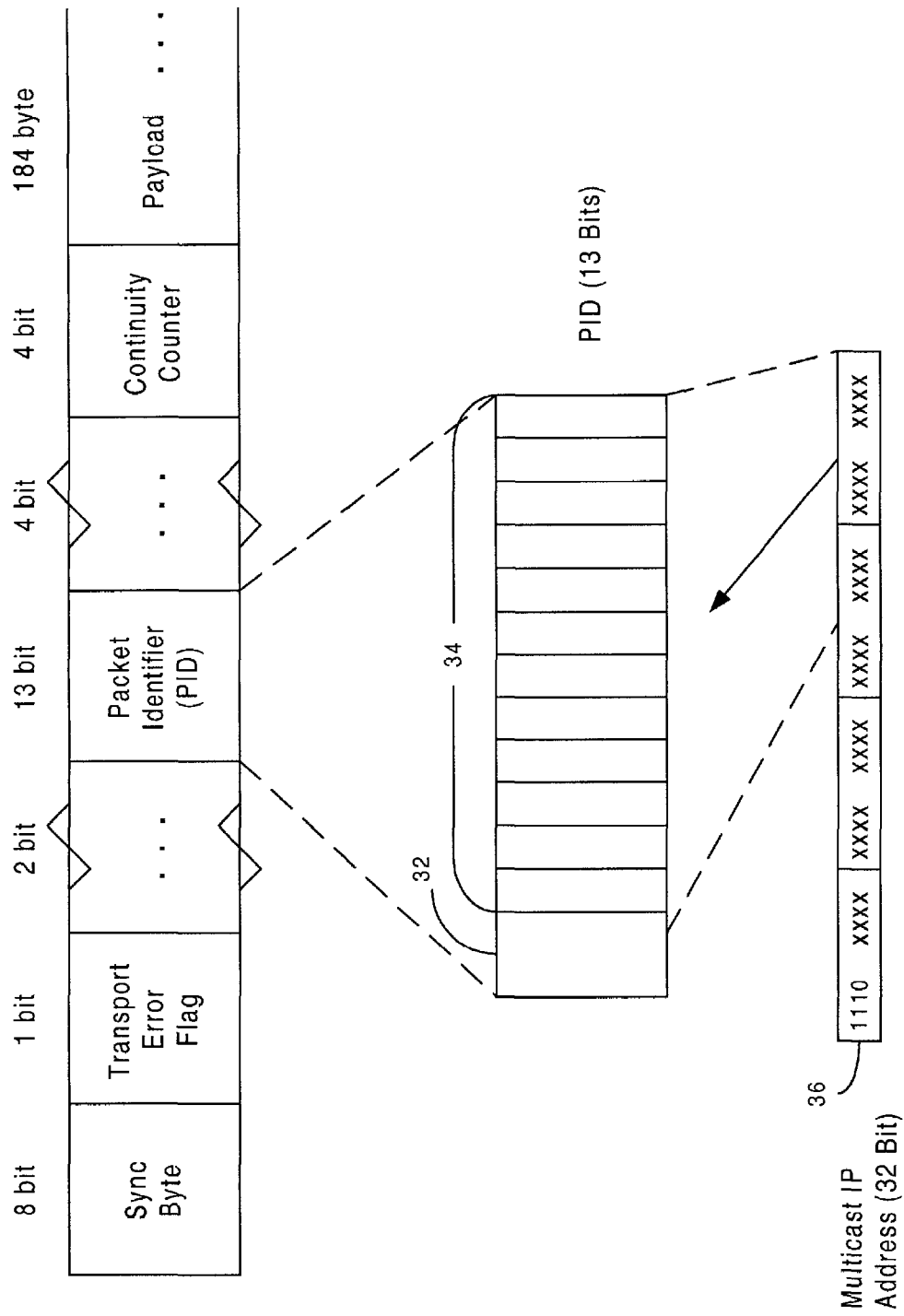
FIG. 2 depicts the header segment of the MPEG2-TS packet and the PID segment of the MPEG2-TS header, with one possible addressing scheme (1-bit flag followed by 12 least significant bits of the address.)

In one embodiment, the network operates in accordance with an MPEG2-TS protocol. The header of a packet of this type is illustrated in FIG. 2. The packet header is four bytes long (32 bits) and is composed of eight fields each conveying different types of information. The field that serves as selection criteria is the 13-bit packet identification (PID) field 30. The first bit 32 is a status value as required by the protocol, and the remaining 12 bits 34 are data that is mapped from the multicast IP address 36. The 32-bit packet header has 11 bits that precede the PID and 8 bits that follow.

Data characterizing the multicast IP address can include, but is not intended to be limited to:

a subset of the multicast address;

a subset of the address upon which a bitwise logic function has operated;

a subset of the address, or the entire address, that has been operated upon by a hashing function;

any part of the address that has been transformed in some way such that information is conveyed about the multicast IP address;

any subset of the multicast IP address, or values derived from any of the above methods, where the position or order of the bits has been altered; or any combination of these methods.

In the embodiment illustrated in FIG. 2, the 12 least significant bits of the multicast IP address are directly mapped to the 12 least significant bits of the PID 34.

Figure 3:
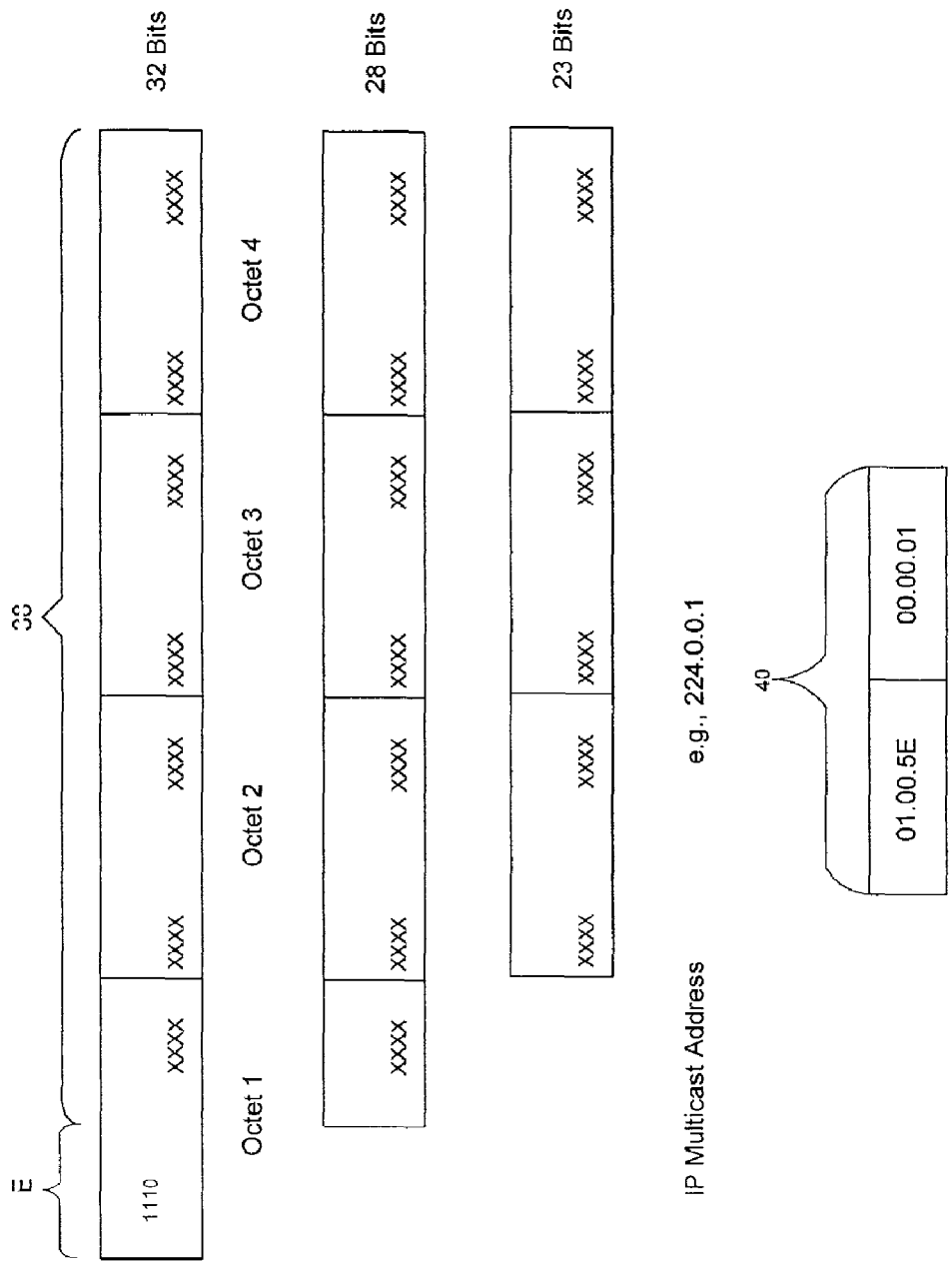
FIG. 3 depicts multicast address segments of an IPv4 address, with an exemplary IP address depicted.
Figure 4:
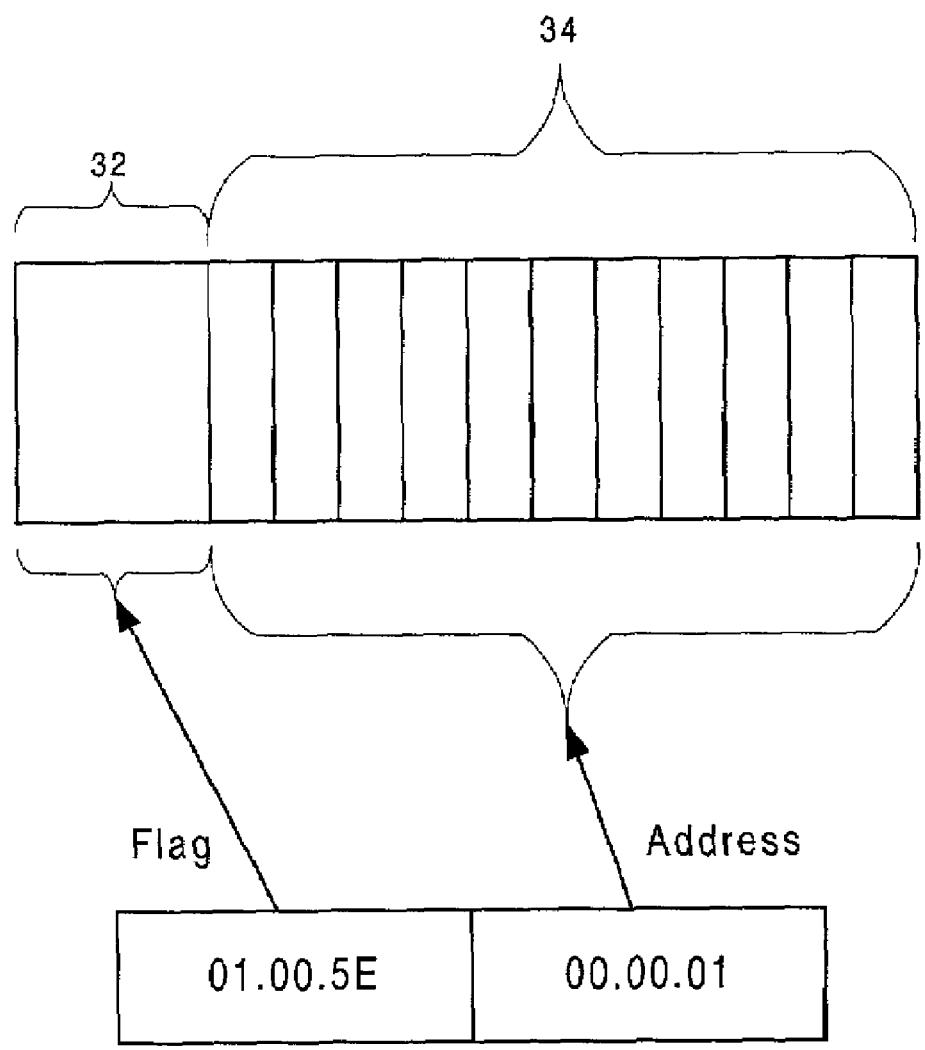
FIG. 4 depicts IP multicast address to PID mapping.

When the receiving terminal selects a multicast IP address to subscribe to (e.g., 224.0.0.1), it uses the 32-bit multicast IP address to determine the selection criteria. In the mapping for IP version 4 depicted in FIG. 3, the first 4 bits of the multicast IP address are the hexadecimal character E (1110), a requirement for all multicast IP addresses. Due to this limitation, multicast addresses have only 28 bits of unique information 38. The 48 bit Ethernet broadcast media access control (MAC) address 40 can only accommodate 23 unique multicast bits. For multicast data, the first 25 bits are fixed by Ethernet standards. Although this allows 32 unique multicast IP addresses to be identified by each MAC address, the system eliminates the majority of extraneous information. This does not impact the selection criteria, as it is typically smaller than the 23 bits available. Thus, FIG. 4 illustrates one embodiment where the PID of desired packets can be mapped from the MAC address by correlating the first three octets of the MAC to the PID flag 32 and the last 12 bits of the MAC address to the remainder of the PID 34.

Figure 5:
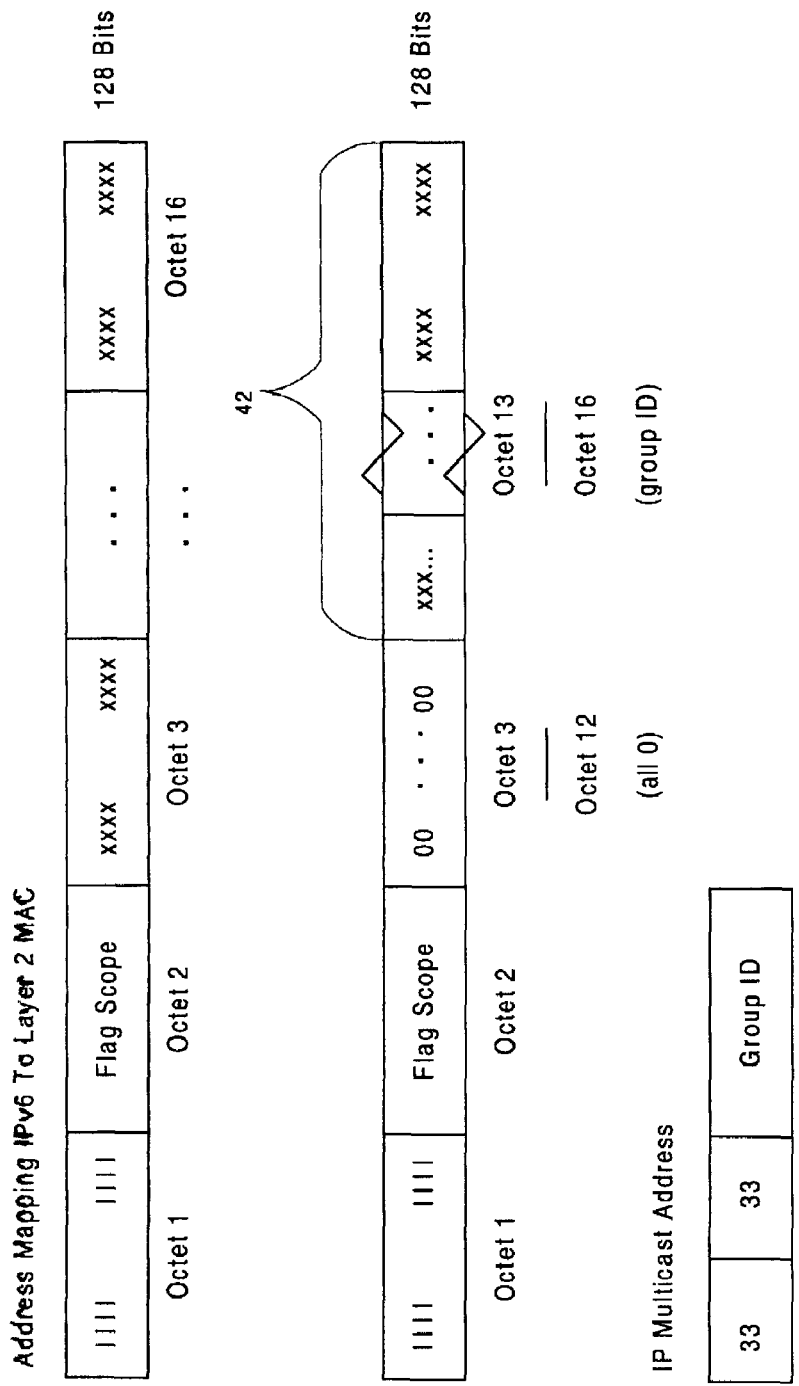
FIG. 5 depicts multicast group address segments of an IPv6 address.

Systems operating with Internet Protocol version 6 (IPv6) use the address mapping illustrated in FIG. 5, which operates in much the same manner as those using Internet Protocol version 4 (IPv4). In the case of IPv6, the address is 128 bits long. For multicast data, the first octet is set to FF (1111 1111), and only the last four octets 42 serve to uniquely identify multicast IP addresses. The last four octets of the address, called the group ID, serve the same purpose as the 32 bit IPv4 multicast IP address. Since the address space allocated for the IP address is similar to that of the group ID, the same methods for hardware level selection are indicated.

Figures 6A, 6B:
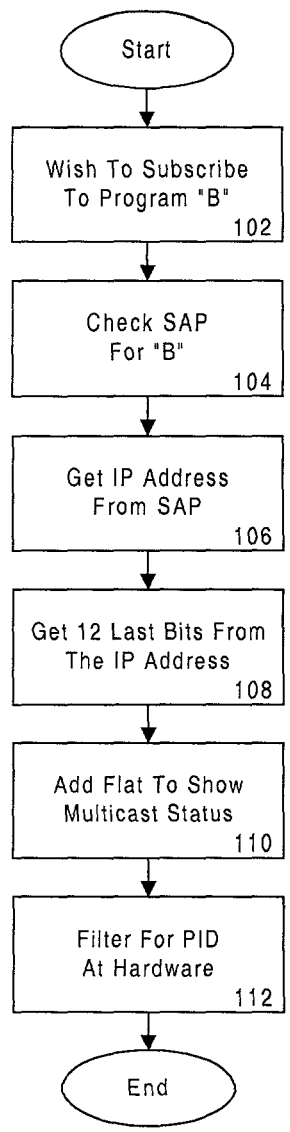
FIG. 6A illustrates an exemplary method by which the receiver filters packets in accordance with one embodiment of the invention.
FIG. 6B illustrates an exemplary table structure sufficient to provide hardware filtration instructions to a receiver.

In a receiving terminal, in one embodiment of this invention, FIG. 6A, wishing to subscribe to a program as in step 102, it is necessary to first determine the multicast IP address of the program, for example "B." This is done in step 104 by referencing a table, the Service Announcement Protocol (SAP), that contains available services and the multicast IP addresses they represent.

The SAP Protocol messages may be conveyed to a plurality of terminals in any umber of ways including, but not limited to:

in the 'well-known' IP multicast address registered for use in SAP service announcements, which are mapped to selection criteria in one embodiment of this invention;

by defining an operator specific multicast address that is used by a plurality of terminals that are customers to a given operator, and which is mapped to selection criteria in one embodiment of this invention;

by acquiring the SAP announcement channel by other means, for example by receiving the information using some protocol via alternate connection to the operator;

by inserting manually, or by software, SAP announcement information; or by any combination of the above.

In step 106, once the multicast IP address is known, the receiving terminal determines the expected value of the PID. In step 108, the PID is determined by appending the 12 least significant bits of the address to a status flag in step 110. This value is used in step 112, at the network interface hardware, in order to accept into software only packets that will likely be relevant.

It is understood that many other possible mappings between multicast IP address and PID are possible, such as using some subset of the multicast IP address, such as the 12 next to the least significant bits, i.e. bits 2-13 of an address.

An exemplary method is shown for mapping services to the selection criteria in FIG. 6B. Here, a table is shown relating the service to its multicast IP address. The multicast IP address is shown in its binary form, and the conversion to PID is illustrated by directly extracting the least significant bits of the address and placing them into the PID.

Figure 7:
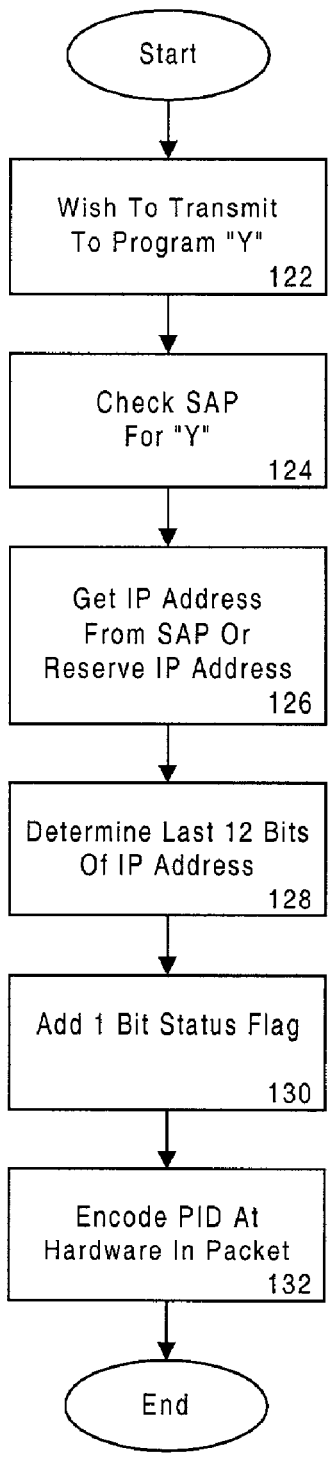
FIG. 7 illustrates an exemplary method by which the transmitters construct packets in accordance with one embodiment of the invention.

Corresponding to the receiving terminal is the transmitting terminal, outlined in FIG. 7. In this FIG, the steps the transmitter takes to determine the PID are the same as those at the receiver, but instead of using hardware to select the packets containing the PID; the transmitted packets are encoded with the correct PID.

In step 122 the transmitter determines the program to which it will subscribe, for example program "Y", and then the multicast IP address of the service it will broadcast is determined from the SAP, in steps 124 and 126. The PID is computed in step 128 by taking the last 12 significant bits of the address, and then in step 130 appending them to the flag indicating that multicast data is included. In step 132, this information is used to create the appropriate field in the packets being broadcast. Other methods of mapping the multicast IP address to the PID are understood.

Figure 8:
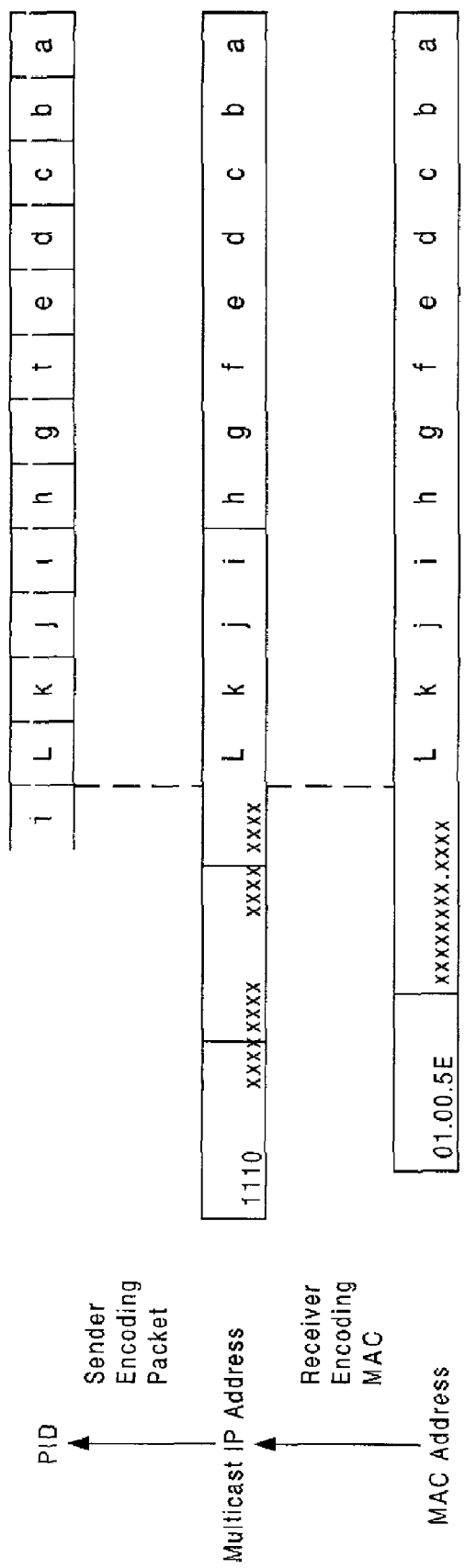
FIG. 8 diagram showing the relationship, in one embodiment of the invention, between the MAC address sought by the receiver, the PID encoded by the transmitter, and the multicast IP address of the data stream.

The relationship between information known by the receiver and the transmitter, and how the multicast IP address interacts with each is depicted in FIG. 8. The transmitter fills the multicast IP address into the PID as the packet is encoded. Later, when the receiving terminal elects to receive the given data, it converts the IP address into the PID for filtration at the network hardware level. Thus, the single value of the multicast IP address ties the receiver to the transmitter in such a way as to make the IP address to PID correspondence table unnecessary.

That there are many other possible embodiments of this invention are understood, and a direct mapping of bits of the multicast IP address to bits of the PID is not necessary, and may be done by a hash function, or some other such transformation.

Figure 9:
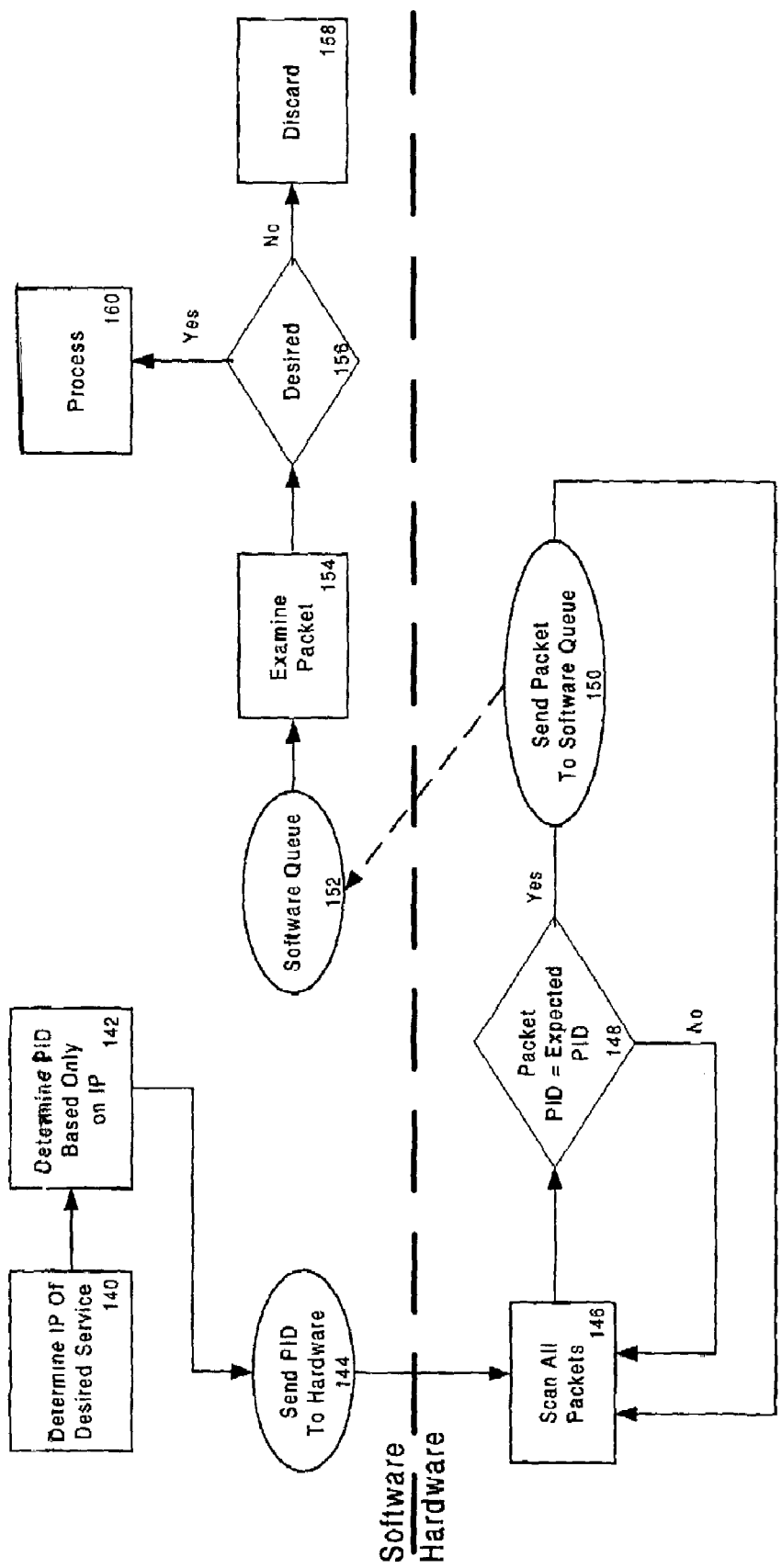
FIG. 9 diagram showing the actions of a receiving terminal on a network according to this disclosure, separating the actions of hardware and software.

The process of hardware packet selection is illustrated in FIG. 9. The software at the receiving terminal calculates the PID as described above 140, 142, translates this into a hardware readable format 144 and proceeds to scan all packets at the hardware level 146. Any packet that matches the selection criteria 148 is admitted to the protocol stack for analysis 150, while other packets are discarded. Further, the packets that are accepted 154 are then analyzed 154 to determine if they are part of a desired stream or have a coincidental PID. Coincidental packets are discarded 158, and useful packets are retained 160.

It is also understood that the above description is only representative of illustrative examples of embodiments and implementations. For the reader's convenience, the above description has focused on a representative sample of all possible embodiments, a sample that teaches the principles of the invention. Other embodiments may result from a different combination of portions of different embodiments. The description has not attempted to exhaustively enumerate all possible variations. For example, the methods disclosed herein can be used on multicast systems such as DVB-T, or on unicast systems. This method can also be used for Ethernet or any other link layer systems.

Alternate embodiments may not have been presented for a specific portion of the invention. Some alternate embodiments may result from a different combination of described portions, or other undescribed alternate embodiments may be available for a portion. This is not to be considered a disclaimer of those alternate embodiments. It is recognized that many of those undescribed embodiments are within the literal scope of the following claims, and others are equivalent.

I claim:

1. A method for constructing a data packet having both a payload segment that carries data associated with a link layer (MAC) or network layer (IP) address and a header segment that has one or more fields, the method comprising:
    generating an address value based on the network layer address or link layer address at a transmitting terminal;
    formatting the address value; and
    populating the formatted address value into a field of the header that will be used as a selection criteria by a receiving terminal, wherein the selection criteria is established without the use of tables used to link a packet identification to a multicast network layer address.

2. An apparatus, comprising:
    at least one processor; and
    at least one memory including executable instructions, the at least one memory and the executable instructions being configured to, in cooperation with the at least one processor, cause the apparatus to perform at least the following:
    construct a data packet having both a payload segment that carries data associated with a link layer (MAC) or network layer (IP) address and a header segment that has one or more fields, the at least one memory and the executable instructions being further configured to, in cooperation with the at least one processor, cause the apparatus to:
    generate an address value based on the network layer address or link layer address;
    format the address value; and
    populate the formatted address value into a field of the header that will be used as a selection criteria by a receiving terminal, wherein the selection criteria is established without the use of tables used to link a packet identification to a multicast network layer address.

3. An article of manufacture, comprising:
    a non-transitory computer readable medium including instructions for:
    constructing a data packet having both a payload segment that carries data associated with a link layer (MAC) or network layer (IP) address and a header segment that has one or more fields, the constructing comprising instructions for:
    generating an address value based on the network layer address or link layer address;
    formatting the address value; and
    populating the formatted address value into a field of the header that will be used as a selection criteria by a receiving terminal, wherein the selection criteria is established without the use of tables used to link a packet identification to a multicast network layer address.

4. An apparatus, comprising:
at least one processor; and
at least one memory including executable instructions, the at least one memory and the executable instructions being configured to, in cooperation with the at least one processor, cause the apparatus to perform at least the following:
select a desired data packet from a plurality of data packets, wherein each of the plurality of data packets comprises a payload segment that carries data associated with a link layer (MAC) or network layer (IP) address and a header segment that has one or more fields, the at least one memory and the executable instructions being further configured to, in cooperation with the at least one processor, cause the apparatus to:
generate an expected value for a field in the header based on the network layer address or link layer address without the use of tables used to link a packet identification to a multicast network layer address, wherein said field is used as selection criteria; and
examine the field used as selection criteria in each packet in a plurality of incoming packets so as to identify packets that contain the expected value.

5. An article of manufacture, comprising:
a non-transitory computer readable medium including instructions for:
selecting a desired data packet from a plurality of data packets, wherein each of the plurality of data packets comprises a payload segment that carries data associated with a link layer (MAC) or network layer (IP) address and a header segment that has one or more fields, the selecting comprising instructions for:
generating an expected value for a field in the header based on the network layer address or link layer address without the use of tables used to link a packet identification to a multicast network layer address, wherein said field is used as selection criteria; and
examining the field used as selection criteria in each packet in a plurality of incoming packets so as to identify packets that contain the expected value.

6. A system comprising:
a transmitting apparatus; and
a receiving apparatus;
the transmitting apparatus being configured to construct a data packet having both a payload segment that carries data associated with a link layer (MAC) or network layer (IP) address and a header segment that has one or more fields, wherein the construction further comprises the transmitting apparatus being configured to:
generate an address value based on the network layer address or link layer address;
format the address value; and
populate the formatted address value into a field of the header that will be used as a selection criteria by a receiving terminal, wherein the selection criteria is established without the use of tables used to link a packet identification to a multicast network layer address;
the receiving apparatus being configured to select a desired data packet from a plurality of data packets, wherein the selection further comprises the receiving apparatus being configured to:
generate an expected value for a field in the header based on the network layer address or link layer address without the use of tables used to link a packet identification to a multicast network layer address, wherein said field is used as selection criteria; and
examine the field used as selection criteria in each packet in a plurality of incoming packets so as to identify packets that contain the expected value.

* * * * *